United States Patent Office 3,157,648
Patented Nov. 17, 1964

3,157,648
DERIVATIVES OF 7-AMINOCEPHALO-SPORANIC ACID
Bruce M. Collins, Philadelphia, Pa., assignor to Smith Kline & French Laboratories, Philadelphia, Pa., a corporation of Pennsylvania
No Drawing. Filed Aug. 25, 1961, Ser. No. 133,776
9 Claims. (Cl. 260—243)

This invention relates to novel organic compounds possessing valuable chemotherapeutic activity and to processes for their preparation. More specifically it pertains to a new class of compounds which are important antimicrobial agents. These compounds demonstrate a high level of activity against such organisms as *Staphylococcus aureus, Diplococcus pneumoniae,* and *Proteus vulgaris.*

The compounds of this invention may be represented by the following structural formula:

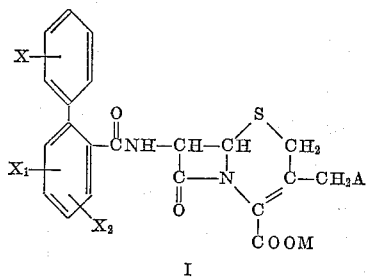

I wherein A is hydrogen, lower alkanoyloxy, benzoyloxy, hydroxy, N-pyridinium or when taken together with M a monovalent carbon-oxygen bond; M is hydrogen, a pharmaceutically acceptable non-toxic cation, an anionic charge when A is pyridinium or when taken together with A a monovalent carbon-oxygen bond; and X, $X_1$ and $X_2$ are alike or different members of the group consisting of hydrogen, halogen, lower alkyl, lower alkoxy, nitro, amino or cyano. In those instances where A is pyridinium, the cationic charge of this group is matched by the anionic charge on the carboxylic acid group as represented by M, the entire molecule being of a Zwitterionic nature. As described above, A also comprises hydroxyl or the lower alkyl acid esters and the benzoic acid esters thereof. Alternatively, the hydroxyl group embraced by A is internally esterified with the carboxylic acid radical of the heterocyclic nucleus, thereby forming a lactone ring as represented by A and M taken together being a monovalent carbon-oxygen bond.

Also embraced within the scope of the present invention are the non-toxic pharmaceutically acceptable salts of the above carboxylic acid radical. The cation comprised in these salts and embraced by M may be, for example, the alkali metal ions such as the sodium ion, potassium ion, calcium ion; the ammonium radical or organic amine cations, such as for example, the cations of triethylamine, procaine, N,N'-dibenzylethylenediamine, N-ethylpiperidine and the like. It should be realized that the novel properties of these compounds are a manifestation of my novel heterocyclic acid and that the above bases are but an exemplification of the many cations suitable for forming pharmaceutically acceptable non-toxic salts of these acids which exhibit the antimicrobial properties herein described.

The substituents X, $X_1$ and $X_2$ include in addition to hydrogen, nitro and cyano, halogen such as fluoro, chloro, bromo, and iodo, lower alkyl such as methyl, ethyl, propyl, butyl, isobutyl and the like, lower alkoxy such as methoxy, ethoxy, propoxy, butoxy and the like and amino including mono and diloweralkylamino.

When substitution is present in the biphenyl system of these novel compounds, its position is designated as follows:

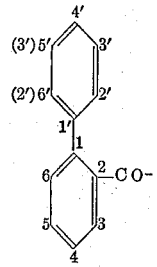

By the terms lower alkyl, lower alkanoyloxy and lower alkoxy when employed in regard to this invention is intended a group embracing a branch or straight-chained hydrocarbon of from 1 to 4 carbon atoms.

The compounds of my invention are prepared by treating a compound of the structure:

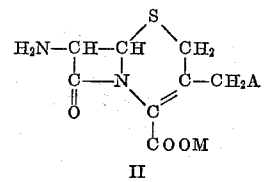

II with a biphenyl-2-carboxylic acid chloride and isolating the product thereby formed. In general, this reaction may be represented as follows:

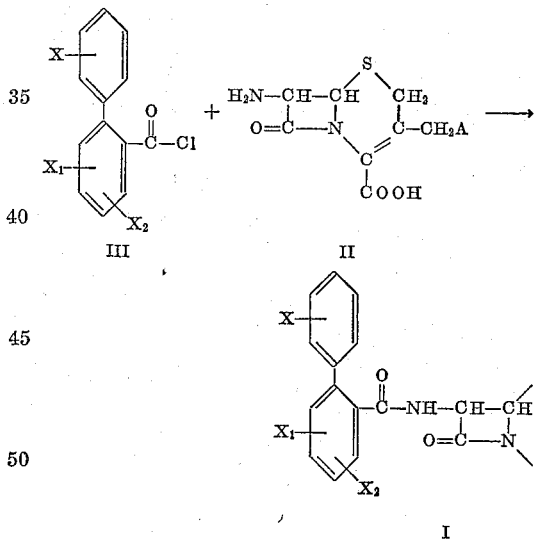

Many of the compounds embraced by Formula III are known to the art. Those which are not may be prepared by procedures analogous to those well known in synthetic organic chemistry as described for example in Chemistry of Carbon Compounds, E. H. Rodd, Ed., vol. III–B, Chap. XVI.

Particularly useful starting materials include the various nitrobiphenyl-2-carboxylic acids. These compounds can be reduced as with tin and hydrochloric acid or catalytically as with platinum and hydrogen and the resultant amine then treated with nitrous acid to yield the corresponding diazonium salt. Following standard techniques these diazonium salts are treated with a suitable reagent to form the particular substituent. For example by employing cuprous chloride, cuprous bromide, cuprous iodide or fluoroboric acid, there are obtained the corresponding chloro, bromo, iodo and fluoro biphenyl-2-carboxylic acids. Similarly by employing cuprous cyanide there is formed the cyanobiphenyl-2-carboxylic acid. Subjecting the diazonium salt to acidic hydrolysis alternatively yields the corresponding hydroxybiphenyl-2-carboxylic acid which may be further modified as for example by treatment with a dialkylsulfate such as dimethyl-sulfate to form the corresponding alkoxy compounds, in this case a methoxybiphenyl-2-carboxylic acid. These various reactions may be typified as follows, although the following is not limiting as to the synthetic routes which are possible:

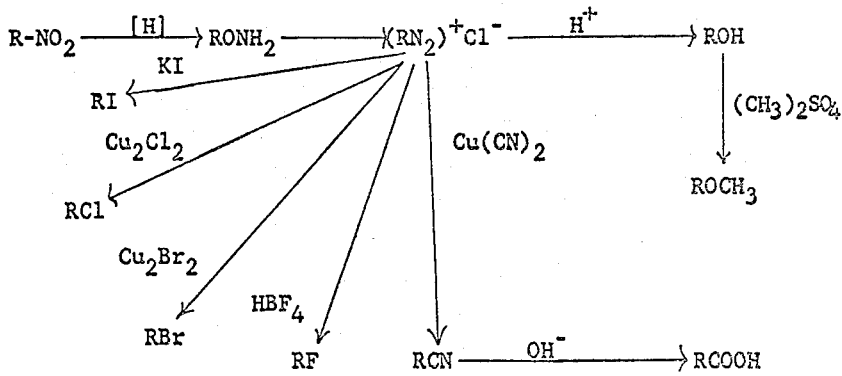
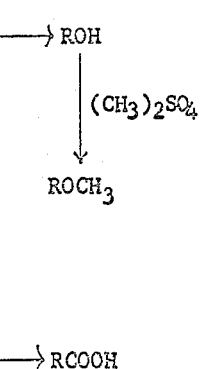

in which R represents the particular biphenyl moiety.

The requisite biphenyl grouping may similarly be readily formed by methods well known to the art, as for example via the Ullman reaction, the benzidine rearrangement, alkaline cleavage of appropriately substituted fluorenones, Grignard reactions, diazonium salt condensations and the like.

The starting materials whose structures are represented by Formula II include for example, 7-aminocephalosporanic acid and certain related derivatives of 7-aminocephalosporanic acid. This heterocyclic compound, 7-aminocephalosporanic acid can be prepared from the antibiotic substance Cephalosporin C whose physical and antimicrobial properties are known to the art and whose structure is represented by the structural formula:

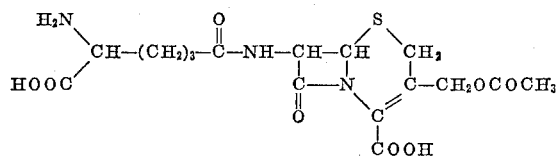

III

Upon hydroxylsis of Cephalosporin C, as for example, acid hydroxysis, there is formed α-aminoadipic acid and 7-aminocephalosporanic acid whose structure may be represented by the formula:

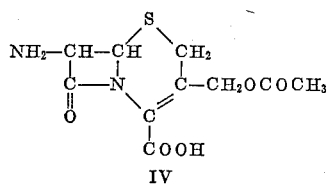

IV

In addition to the formation of 7-aminocephalosporanic acid upon hydrolysis of Cephalosporin C, there is also further formed by hydrolysis of the acetyloxy grouping and subsequent internal esterification, the lactone having the formula:

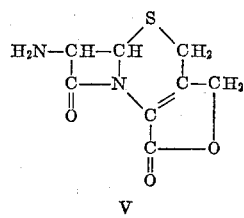

V

The two products designated by Formula IV and Formula V, whose preparations are described in Belgian Patent No. 593,777, are readily separated by virtue of the different physical properties, as for example, by chromatographic techniques.

It is further possible to modify the structure of 7-aminocephalosporanic acid by enzymatic cleavage of the acetyloxy grouping without subsequent lactone formations. There is thus formed the compound 3-hydroxymethyl-7-aminodecephalosporanic acid represented by the formula:

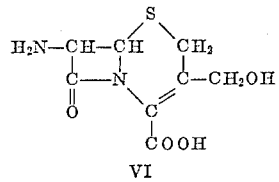

VI

The designation decephalosporanic acid is herein employed for purposes of nomenclature only and intended to represent the basic heterocyclic acid nucleus having the formula:

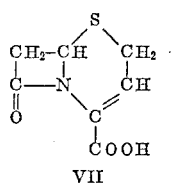

VII

This cleavage of the acetyloxy grouping to form 3-hydroxymethyl-7-aminodecephalosporanic acid without subsequent lactone formations may be accomplished by employing enzymatic means, as for example by the action of an acetylesterase. Such suitable enzyme preparations may be obtained for example, from citrus fruits such as oranges, grapefruit, lemons and the like, as described by Jansen et al., Arch. Biochem., 15, 415 (1957). Preparations of such an enzyme advantageously effect hydrolysis of the acetyloxy side chain without subsequent lactone formation. The resultant hydroxyl group may then be further modified as by re-esterification with a lower alkanoic acid radical or a benzoic acid radical so as to form the lower alkanoate esters homologous to the acetate ester present in the naturally occurring Cephalosporin C or the corresponding benzoate ester.

As the conditions and reagents employed in acylating hydroxyl groups are similar to those for acylating amino groups, it is generally desirable in practice to effect acylation of the hydroxymethyl group in the 3-position of decephalosporanic acid, after formation of the carboxyamido group in the 7-position. Deacetylation on either Cephalosporin C or 7-aminocephalosporanic acid according to the enzymatic techniques discussed herein followed by reacylation of the resultant hydroxyl group generally results in concurrent acylation of the amino group in the 7-position of 7-aminocephalosporanic acid respectively. Thus in practice, Cephalosporin C is cleaved by acid hydrolysis as herein described to yield 7-aminocephalosporanic acid which in turn is subjected to the procedure of this invention to obtain the 7-biphenylcarboxyamido derivative of cephalosporanic acid. This compound may then be treated with acetylesterase as herein described to yield the corresponding compound containing a hydroxymethyl group in the 3-position which in turn is reacylated by methods analogous to those known to the art, such as for example, by means of an acyl halide or acid anhydride.

Treatment of Cephalosporin C with a tertiary base such as for example, pyridine, quinoline, or collidine prior to acidic hydrolytic cleavage of the aminoadipic acid side chain forms a quaternary salt derivative of Cephalosporin C which when hydrolyzed yields a nucleus which, in the case of pyridine, has been assigned the name, 3-pyridiniummethyl-7-aminodecephalosporanic acid inner salt and the structure:

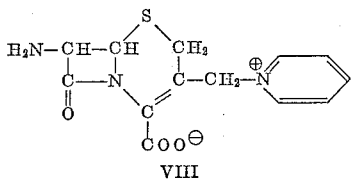

VIII

Those starting materials embraced by Formula II wherein A represents hydrogen are obtained by catalytic hydrogenation of Cephalosporin C with a palladium catalyst, protection of the amino group on the α-amino adipoyl side chains as by treatment with 1-fluoro-2,4-dinitrobenzene and subsequent acidic hydrolysis.

The compounds of my invention are administered in any of the usual pharmaceutical forms such as for example, in the form of tablets and capsules for oral administration, creams and ointments for topical application, or solutions and suspensions for injectable or various topical applications. While these compounds are highly advantageous oral antibacterial agents, they may also be administered topically or via the intraparenteral routes.

The following examples will serve to further typify the nature of my invention; however, these examples should not be construed as restricting the scope of this invention, the scope being defined only by the appended claims.

*Example 1*

Four grams of Cephalosporin C as the sodium salt are dissolved in 60 ml. of water and the pH adjusted to 2.5 by the addition of the acid form of Dowex 50 (x8). The resin is filtered and washed with 20 ml. of water and to the combined filtrate and washings are added 20.5 ml. of 0.1 N hydrochloric acid. The mixture is allowed to stand for 72 hours at 20° C. and at the end of this time introduced onto a column of Dowex-1 (as the acetate form), 2 cm. x 10 cm. The initial percolate is collected in 10 ml. fractions and upon the collection of fraction 12 the column is eluted with water until a total of 34 fractions have been collected. The column is thereupon eluted with 0.5 N acetic acid and an additional 65 fractions collected.

Fractions 36 through 45 are combined and concentrated by freeze drying to yield 7-aminocephalosporanic acid.

Fractions 2 through 16 are combined and concentrated in vacuo to yield the lactone of desacetyl Cephalosporin C which when resubjected to the above acid hydrolysis procedure yields 3 - hydroxymethyl-7-aminodecephalosporanic acid lactone.

By increasing the concentration of the acid in the above procedure from 0.1 N to 1.0 N and the length of reaction to four days, the amounts of desacetyl Cephalosporin C lactone and 3 - hydroxymethyl-7-aminocephalosporanic acid lactone are increased.

*Example 2*

(A) One gram of Cephalosporin C as the sodium salt is dissolved in 50 ml. of water. There is then added sufficient Dowex 50 (x8) resin as the hydrogen form to adjust the pH to 2.6. The resin is removed by filtration and to the filtrate is added 3.8 ml. of pyridine, the pH rising to approximately 6.5. The solution is maintained in a glass container at 37° C. for 48 hours. At the end of this time the solution is freezed dried and the residue, triturated twice with 50 ml. of acetone and redried. The solid is then dissolved in 10 ml. of water and introduced onto a Dowex-1 (x10) acetate column (2 cm. x 10 cm.). The column is eluted with water and 10 ml. fractions are collected. Fractions 2 through 4 are then combined and freezed dried to yield the pyridinium inner salt of desacetyl Cephalosporin C.

(B) This material is then subjected to the acidic hydrolytic procedure as described in Example 1. Upon chromatographic separation as described therein, the earlier fractions collected are combined and reduced to a residue to yield 3-pyridiniummethyl-7-aminodecephalosporanic acid inner salt. The latter fractions are combined and concentrated to a residue to yield the pyridinium inner salt of desacetyl Cephalosporin C which may be resubjected to the hydrolytic procedure to yield additional material.

*Example 3*

Cephalosporin C sodium salt dihydrate (.75 g.) in sufficient water to effect dissolution is added to an aqueous suspension of 2.0 g. of 10% palladium on carbon in 30 ml. of water which has been previously saturated with hydrogen. The mixture is hydrogenated with agitation at one atmosphere pressure for 1 hour.

The catalyst is removed by centrifugation and the supernatant is preserved. The catalyst is then extracted with 80% aqueous methanol at pH 8, and these extracts then adjusted to pH 6 by the addition of hydrochloric acid. The extract is evaporated to a small volume and added to the original reaction solution. The combined solution is then brought to pH 6 with sodium hydroxide and lyophilized to yield the product as the sodium salt.

The product obtained (.3 g.) is dissolved in 7 ml. of water containing .25 g. of anhydrous sodium bicarbonate. To this stirred solution is added .25 g. of 1-fluoro-2,4-dinitrobenzene in 7 ml. of ethyl alcohol. The mixture is stirred in the dark at room temperature for 2½ hours. The pH of the solution is then adjusted to 5 by the addition of concentrated hydrochloric acid and the alcohol is removed under reduced pressure.

The mixture is adjusted to pH 7 by the addition of sodium bicarbonate and extracted with ether to remove excess 1-fluoro-2-,4-dinitrobenzene, yielding a clear aqueous solution. The pH is adjusted to 2.5 by the addition of concentrated hydrochloric acid and extracted several times with ethylacetate. These ethyl acetate extracts are washed with water, dried over anhydrous sodium sulfate and evaporated to a residue.

The solid obtained (1 g.) is dissolved in 10 ml. of acetonitrile and 10 ml. of N-hydrochloric acid. This solution is stored in the dark at 37° under nitrogen for 64 hours.

At the end of this time, 20 ml. of water are added to this solution and the solution then extracted five times with 10 ml. portions of ethyl acetate. The residual solution is then brought to pH 6 with N-sodium hydroxide, and added to a column of Dowex-1 (x8) (acetate form, 3 cm. x 5 cm.). When all of the solution has been introduced onto the column, the column is washed with 60 ml. of water and then the product eluted with 2 N acetic acid. Lyophilization of the acetic acid eluate yields the product, 3-methyl-7-aminodecephalosporanic acid as a solid.

Example 4

(A) A solution of 3.96 g. (0.02 mole) of biphenyl-2-carboxylic acid is allowed to react with 11 ml. of thionyl chloride for 15 hours at room temperature. The resultant solution is evaporated in vacuo at 35° C. and to the oil so obtained is added 25 ml. of benzene. The mixture is again subjected to evaporation and an additional 25 ml. of benzene is then added and the mixture re-evaporated. Finally the mixture is held under vacuum to remove any traces of thionyl chloride and the mixture then distilled to yield biphenyl-2-carboxylic acid chloride.

(B) Four grams (.0185 mole) of biphenyl-2-carboxylic acid chloride are dissolved in 50 ml. of dried acetone. This solution is slowly added with stirring to 5 g. of 7-aminocephalosporanic acid in 190 ml. of 3% sodium bicarbonate solution. The reaction mixture is maintained at 15° for 1½ hours and then extracted twice with 150 ml. of ether. To the residual aqueous solution is added 40 ml. of butyl acetate and this mixture is then cooled to below 10° and adjusted to pH 2.4 with 20% phosphoric acid. The phases are separated and the aqueous phase extracted with 15 ml. of butyl acetate. This butyl acetate extract is combined with the organic layer and these combined layers are adjusted to pH 3 and then washed with 10 ml. of water. The washed organic solution is dried over magnesium sulfate, filtered and to the filtrate is added 9.6 ml. of 30% potassium-2-ethylhexanoate in isopropanol. One volume of ether is then added with stirring and the crystals which form upon cooling are collected by filtration, washed with 1:1 ether-butyl acetate, with ether alone and finally dried to yield 7-(biphenyl-2-carboxyamido)-cephalosporanic acid as the potassium salt.

Treatment of an aqueous solution of this potassium salt and extraction with ether then yields the free acid, 7-(biphenyl-2-carboxyamido)-cephalosporanic acid.

Example 5

The following compounds are subjected to the procedure of Example 4: 5-chlorobiphenyl-2-carboxylic acid, 2'-chlorobiphenyl-2-carboxylic acid, 2'-bromobiphenyl-2-carboxylic acid, 2'-fluorobiphenyl-2-carboxylic acid, 4-chlorobiphenyl-2-carboxylic acid, 4'-chlorobiphenyl-2-carboxylic acid, 5-bromobiphenyl-2-carboxylic acid and 4-bromobiphenyl-2-carboxylic acid. There are thus respectively obtained upon completion of the described steps the compounds: 7-(5-chlorobiphenyl-2-carboxyamido)-cephalosporanic acid, 7-(2'-chlorobiphenyl-2-carboxyamido) - cephalosporanic acid, 7 - (2' - bromobiphenyl-2-carboxyamido)-cephalosporanic acid, 7-(2'-fluorobiphenyl - 2 - carboxyamido) - cephalosporanic acid, 7-(4-chlorobiphenyl-2 - carboxyamido) - cephalosporanic acid, 7 - (4' - chlorobiphenyl - 2 - carboxyamido) - cephalosporanic acid, 7-(5-bromobiphenyl-2-carboxyamido)-cephalosporanic acid and 7-(4-bromobiphenyl-2-carboxyamido)-cephalosporanic acid.

Example 6

By employing 8.5 g. of 4'-methylbiphenyl-2-carboxylic acid in the procedure of Example 4, there is obtained the compound 7-(4'-methylbiphenyl-2-carboxyamido)-cephalosporanic acid.

Likewise by employing 2'-isopropylbiphenyl-2-carboxylic acid, 2'-methoxybiphenyl-2-carboxylic acid, 3-methoxybiphenyl-2-carboxylic acid, 6-methoxybiphenyl-2-carboxylic acid, 2'-methylbiphenyl-2-carboxylic acid, 6-ethylbiphenyl-2-carboxylic acid, 4,4'-dimethoxybiphenyl-2-carboxylic acid, 4-methylbiphenyl-2-carboxylic acid, 5-methylbiphenyl-2-carboxylic acid, and 6-methylbiphenyl-2-carboxylic acid, there are respectively formed the compounds, 7-(2'-isopropylbiphenyl-2-carboxyamido)-cephalosporanic acid, 7-(2'-methoxybiphenyl-2-carboxyamido)-cephalosporanic acid, 7-(3-methoxybiphenyl-2-carboxyamido)-cephalosporanic acid, 7-(6-methoxybiphenyl-2-carboxyamido)-cephalosporanic acid, 7-(2'-methylbiphenyl-2-carboxyamido)-cephalosporanic acid, 7-(6-ethylbiphenyl-2-carboxyamido)-cephalosporanic acid, 7-(4,4' - dimethoxybiphenyl - 2 - carboxyamido) - cephalosporanic acid, 7-(4-methylbiphenyl-2-carboxyamido)-cephalosporanic acid, 7-(5-methylbiphenyl-2-carboxyamido)-cephalosporanic acid and 7-(6-methylbiphenyl-2-carboxyamido)-cephalosporanic acid.

Example 7

6-iodo-4'-methoxy-4-methylbiphenyl-2-carboxylic acid (7.36 g.) is employed in place of biphenyl-2-carboxylic acid in the procedure of Example 4. There is thus obtained 7-(6-iodo-4'-methoxy-4-methylbiphenyl-2-carboxyamido)-cephalosporanic acid.

Similarly from 4,5-dimethoxy-2'-nitrobiphenyl-2-carboxylic acid and 4,4'-dibromobiphenyl-2-carboxylic acid, there are respectively obtained 7-(4,5-dimethoxy-2'-nitrobiphenyl-2-carboxyamido)-cephalosporanic acid and 7-(4,4' - dibromobiphenyl - 2 - carboxyamido) - cephalosporanic acid.

Example 8

To a solution of 288 g. (1 mole) of 4,6-dinitrobiphenyl-2-carboxylic acid in ethanol is added 10 g. of platinum dioxide. The solution is then subjected to catalytic hydrogenation for 60 minutes. At the end of this time the mixture is cooled and poured into equal volume of water. The solid which forms is collected by filtration and recrystallized from heptane to yield 4,6-diaminobiphenyl-2-carboxylic acid. Five hundred seventy-five milliliters of 6 N sulfuric acid are cooled to 0° C. and 114 g. (0.5 mole) of 4,6-diaminobiphenyl-2-carboxylic acid are added. There is then slowly added at 5° C. 71 g. (1 mole) of sodium nitrite in 175 ml. of water. The mixture is stirred at 5° for one hour. The diazonium salt solution is slowly added over a 15 minute period to a stirred refluxing solution of 198 g. of cuprous chloride in 2000 ml. of 6 N hydrochloric acid.

The mixture is refluxed for 30 minutes and then allowed to attain room temperature. The solid which forms is collected by filtration and washed with water to yield 4,6-dichlorobiphenyl-2-carboxylic acid. This compound (5.34 g.) is then employed in the procedure of Example 4, and there is thus obtained upon completion of the steps therein described the compound 7-(4,6-dichlorobiphenyl-2-carboxyamido)-cephalosporanic acid.

Example 9

Fifty grams of 4,5-dichloro-2-aminobenzoic acid are refluxed for 4 hours in 100 ml. of absolute methanol and 5 ml. of concentrated sulfuric acid. The excess methanol is removed under reduced pressure and the residue distilled in vacuo to yield methyl 4,5-dichloro-2-aminobenzoate.

Twenty-three grams (0.1 mole) of methyl 4,5-dichloro-2-aminobenzoate are added to 30 ml. of hydrochloric acid and 10 ml. of water. This paste is then diazotized in the usual manner with aqueous sodium nitrite. To the resulting diazonium salt mixture is added 150 ml. of benzene at 0° with vigorous stirring. There is then slowly added a solution of 3 g. of sodium hydroxide in 30 ml. of water after which stirring is continued for 10 hours at room temperature. The reaction mixture is then acidified with concentrated hydrochloric acid and extracted with benzene. These organic extracts are dried over magnesium sulfate, the drying agent removed by filtration, and the organic solution distilled in vacuo to yield methyl 4,5-dichlorobiphenyl-2-carboxylate.

Methyl 4,5-dichlorobiphenyl-2-carboxylate is then refluxed in 10% aqueous sodium hydroxide solution for 4 hours. At the end of this time the reaction mixture is cooled and the pH adjusted to 9.5. The mixture is filtered and the filtrate thus obtained acidified to Congo red with hydrochloric acid. The solid which thus forms is collected by filtration, washed with water and dried to yield 4,5-dichlorobiphenyl-2-carboxylic acid.

4,5-dichlorobiphenyl-2-carboxylic acid (5.35 g.) is substituted for biphenyl-2-carboxylic acid in the procedure of Example 4. Upon completion of the steps described therein, there is obtained the compound 7-(4,5-dichlorobiphenyl-2-carboxyamido)-cephalosporanic acid.

*Example 10*

2'-cyanobiphenyl-2-carboxylic acid (4.46 g.) is substituted for 4-chlorobiphenyl-2-carboxylic acid in the procedure of Example 4. Upon completion of the steps therein described, there is obtained the compound 7-(2'-cyanobiphenyl-2-carboxyamido)-cephalosporanic acid.

*Example 11*

Four grams of 3-hydroxymethyl-7-aminodecephalosporanic acid lactone (as prepared in Example 1) is treated with biphenyl-2-carboxylic acid chloride according to the initial procedure of Example 4, part B. The reaction mixture is then extracted with butyl acetate and these organic extracts concentrated to a residue comprising 3-hydroxymethyl - 7 - (biphenyl-2-carboxyamido)-decephalosporanic acid lactone which is further purified by successive recrystallization from ether.

In a similar fashion the substituted biphenyl-2-carboxylic acids described in the above examples in the form of their acid chlorides are employed in place of 2-phenylbenzoic acid in the method of this example to yield the corresponding biphenyl-2-carboxyamido derivatives of 3-hydroxymethyldecephalosporanic acid.

*Example 12*

An equivalent amount of 3-pyridiniummethyl-7-aminodecephalosporanic acid inner salt is employed in place of 3-hydroxymethyl-7-aminodecephalosporanic acid lactone in the procedure of Example 11. Upon completion of the steps therein described, there is thus obtained the compound 3-pyridiniummethyl-7-(biphenyl-2-carboxyamido)-decephalosporanic acid inner salt.

Likewise by employing 2'-bromobiphenyl-2-carboxylic acid, 3'-nitrobiphenyl-2-carboxylic acid and 3-methoxybiphenyl-2-carboxylic acid, there are obtained the compounds 3-pyridiniummethyl-7-(2'-bromobiphenyl-2 - carboxyamido)-decephalosporanic acid inner salt, 3-pyridiniummethyl-7-(3'-nitrobiphenyl-2-carboxyamido) - decephalosporanic acid inner salt and 3-pyridiniummethyl-7-(3-methoxybiphenyl - 2 - carboxyamido)-decephalosporanic acid inner salt.

*Example 13*

To 25 ml. of thionyl chloride are added 10.7 g. of 4'-chlorobiphenyl-2-carboxylic acid. The reaction mixture is processed according to the procedure of Example 4A so as to obtain the compound 4'-chlorobiphenyl-2-carboxylic acid chloride.

A solution is prepared containing 4 g. of 4'-chlorobiphenyl-2-carboxylic acid chloride in 50 ml. of dried acetone and this solution is added with stirring to 3.9 g. of 3-methyl-7-aminodecephalosporanic acid in 190 ml. of 3% sodium bicarbonate solution. The mixture is stirred for 1½ hours at 25° C. and at the end of this time extracted twice with 150 ml. portions of ether. To the residual aqueous solution is added 40 ml. of butyl acetate and this mixture is then cooled to a temperature below 10° for adjustment of the pH to 2.4 with 20% phosphoric acid. The phases are separated and the aqueous phase extracted with 15 ml. of butyl acetate. These butyl acetate extracts are combined with the organic layer and the combined organic solutions then washed with an aqueous solution at pH 3. The washed organic solution is then dried over magnesium sulfate and to it is added 9.6 ml. of 30% potassium 2-ethylhexanoate in isopropanol. A volume of ether is added with stirring and the crystals formed upon cooling are collected by filtration, washed with 1:1 ether-butyl acetate, with ether alone and finally dried to yield 3-methyl-7-(4'-chlorobiphenyl - 2-carboxyamido)-decephalosporanic acid as the potassium salt. The free acid is obtained by treatment with acid as heretofore described.

*Example 14*

Following the procedure of Example 13, the following biphenyl-2-carboxylic acids are employed in place of 4'-chlorobiphenyl-2-carboxylic acid: 4,5-dichlorobiphenyl-2-carboxylic acid, 4'-methylbiphenyl-2-carboxylic acid, 3-methoxybiphenyl-2-carboxylic acid, 4,4'-dibromobiphenyl-2-carboxylic acid and 2'-cyanobiphenyl-2-carboxylic acid. There are thus obtained the compounds 3-methyl-7-(4,5-dichlorobiphenyl - 2 - carboxyamido)-decephalosporanic acid, 3-methyl-7-(4'-methylbiphenyl - 2 - carboxyamido)-decephalosporanic acid, 3-methyl-7-(3-methoxybiphenyl-2-carboxyamido)-decephalosporanic acid, 3-methyl - 7-(4,4'-dibromobiphenyl - 2 - carboxyamido)-decephalosporanic acid, and 3-methyl-7-(2'-cyanobiphenyl-2-carboxyamido)-decephalosporanic acid.

*Example 15*

A preparation of acetylesterase obtained from the peels of 72 oranges according to the procedure of Jansen et al., Arch. Biochem. 15, 415 (1947) is added to 1 g. of 7-(biphenyl - 2 - carboxyamido)-cephalosporanic acid dissolved in 15 ml. of water. The pH 1 is adjusted to 6 and maintained at or above this level for 15 hours. At the end of this time, the solution is passed through an IR 4B column (in the acetate form) and eluted with aqueous 0.1 M acetic acid which has been adjusted to pH 5.5 by the addition of pyridine. The solutions collected by development of the column are adjusted to pH 8 by the addition of sodium hydroxide and this alkaline mixture is evaporated in vacuo to yield 3-hydroxymethyl-7-(biphenyl2-carboxyamido)-decephalosporanic acid as the sodium salt.

To 1 g. of 3-hydroxymethyl-7-(biphenyl-2-carboxyamido)-decephalosporanic acid in 10 ml. of collidine are added 15 ml. of propionyl chloride. The mixture is allowed to stand for 10 hours and at the end of this time poured into 25 ml. of ice water. The solid which is thus formed is collected by filtration, recrystallized from dimethylformamide and dried to yield 3-propionyloxymethyl-7-(biphenyl-2-carboxyamido) - decephalosporanic acid. In a similar fashion other lower alkanoyl chlorides such as butanoyl chloride or pentanoyl chloride are employed in place of propionyl chloride, thereby obtaining the corresponding compounds, 3-butanoyloxy-7-(biphenyl-2-carboxyamido)-decephalosporanic acid and 3-pentanoyloxymethyl-7-(biphenyl-2-carboxyamido) - decephalosporanic acid.

In an analogous fashion benzoyl chloride is employed in the place of these lower alkanoyl chlorides and there is thus obtained 3-benzoyloxymethyl-7-(biphenyl-2-carboxyamido)-decephalosporanic acid.

By substituting 7-(4,4'-dichlorobiphenyl - 2 - carboxyamido)-cephalosporanic acid and 7-(4,5-dichlorobiphenyl-2-carboxyamido)-cephalosporanic acid in the procedures of this example, the compounds 3-propionylmethyl-7-(4,4'-dichlorobiphenyl - 2 - carboxyamido) - decephalosporanic acid, 3-propionyloxymethyl - 7 - (3-methoxybiphenyl-2-carboxyamido)-cephalosporanic acid and 3-propionyloxymethyl-7-(4,5-dichlorobiphenyl - 2 - carboxyamido)-decephalosporanic acid are respectively obtained.

In a similar manner, by employing benzoyl chloride, the following benzoate esters of the above compounds are prepared: 3 - benzoyloxymethyl - 7 - (4,4' - dichlorobiphenyl-2-carboxyamido)-decephalosporanic acid, 3-benzoyloxy - 7 - (3 - methoxybiphenyl - 2 - carboxyamido)-decephalosporanic acid and 3-benzoyloxymethyl-7-(4,5-dichlorobiphenyl - 2 - carboxyamido - (decephalosporanic acid.

Example 16

One gram of 7-(biphenyl-2-carboxyamido)-cephalosporanic acid dissolved in excess amyl acetate and to the solution is added 10 g. of N-ethylpiperidine. The solution is stirred for 30 minutes and the crystals formed upon standing are collected by filtration and dried to yield the N-ethylpiperidine salt of 7-(biphenyl-2-carboxyamido)-cephalosporanic acid.

Example 17

To a solution of 1 g. of 3-methyl-7-(4,5-dichlorobiphenyl-2-carboxyamido)-decephalosporanic acid in excess amyl acetate is added 10 g. of triethylamine. The solution is stirred for 30 minutes and allowed to stand. The solid which forms is collected by filtration and dried to yield the triethylamine salt of 3-methyl-7-(4,5-dichlorobiphenyl-2-carboxyamido)-decephalosporanic acid.

Similarly by substituting 3-methyl-7-(biphenyl-2-carboxyamido)-decephalosporanic acid in the procedure of the present example, there is obtained the triethylamine salt of 3-methyl-7-(biphenyl-2-carboxyamido)-decephalosporanic acid.

Example 18

One gram of the potassium salt of 7-(biphenyl-2-carboxyamido)-cephalosporanic acid is dissolved in water at room temperature and 10 ml. of a 10% aqueous solution of N,N'-dibenzylethylenediamine acetate are added. The mixture is stirred and allowed to stand for one hour and then cooled. The solid which forms is collected by filtration and dried to yield 7-(biphenyl-2-carboxyamido)-cephalosporanic acid as the N,N'-dibenzylethylenediamine salt.

By employing an equivalent amount of N,N'-bis(dehydroabietyl)-ethylenediamine acetate in place of N,N'-dibenzylethylenediamine acetate, there is obtained 7-(biphenyl-2-carboxyamido)-cephalosporanic acid as the N,N'-bis-(dehydroabietyl)-ethylenediamine salt.

I claim:

1. Compounds having the formula:

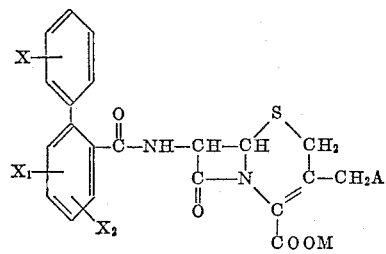

wherein each of X, $X_1$ and $X_2$ is selected from the group consisting of hydrogen, halogen, lower alkyl, lower alkoxy, nitro, amino or cyano, A is selected from the group consisting of hydrogen, lower alkanoyloxy, benzoyloxy, hydroxy, N-pyridinium, and a monovalent carbon-oxygen bond when taken together with M; and M is selected from the group consisting of hydrogen, an anionic charge when A is N-pyridinium, a monovalent carbon-oxygen bond when taken together with M, and pharmaceutically acceptable non-toxic cations.

2. Compounds according to claim 1 wherein X, $X_1$ and $X_2$ are hydrogen.

3. Compounds having the formula:

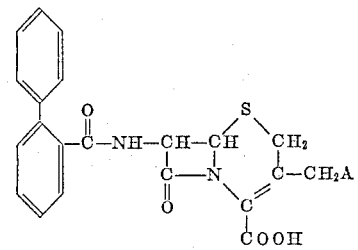

wherein A is lower alkanoyloxy.

4. 7-(biphenyl-2-carboxyamido)-cephalosporanic acid.
5. 3-methyl-7-biphenyl-2-carboxyamido)-decephalosporanic acid.
6. 3-pyridinium-7-(biphenyl-2-carboxyamido)-decephalosporanic acid inner salt.
7. 3-hydroxymethyl-7-(biphenyl-2-carboxyamido)-decephalosporanic acid lactone.
8. 7-(4,5-dichlorobiphenyl-2-carboxyamido)-cephalosporanic acid.
9. 3-methyl-7-(4,5-dichlorobiphenyl-2-carboxyamido)-decephalosporanic acid.

References Cited in the file of this patent

UNITED STATES PATENTS 2,941,995 Doyle et al. _____ June 21, 1960

FOREIGN PATENTS 593,777 Belgium _____ Dec. 1, 1960